United States Patent [19]

Mortensen

[11] Patent Number: 5,366,338
[45] Date of Patent: Nov. 22, 1994

[54] LIFT AND TOW MOTORCYCLE TRANSPORTER

[76] Inventor: Ernest P. Mortensen, 5605 S. Robin Ave., Tucson, Ariz. 85746

[21] Appl. No.: 55,551

[22] Filed: May 3, 1993

[51] Int. Cl.⁵ .............................................. B60D 7/00
[52] U.S. Cl. ................................. 414/563; 280/402; 224/273; 414/427; 414/462; 254/4 R
[58] Field of Search .............. 414/463, 563, 592, 426, 414/427, 428, 540, 462, 466; 280/482; 187/9 R; 254/2 R, 4 R, 4 C, DIG. 4; 224/273, 42.26, 42.12, 42.21, 42.06, 42.03 A, 42.03 B

[56] References Cited

U.S. PATENT DOCUMENTS

| | | | |
|---|---|---|---|
| 3,837,513 | 9/1974 | Adamek | 414/462 |
| 3,963,129 | 6/1976 | Clayton | 414/563 |
| 4,738,581 | 4/1988 | Kuhlman | 414/462 |
| 4,778,333 | 10/1988 | Youmans et al. | 280/402 X |
| 5,123,802 | 6/1992 | Bell | 414/427 X |
| 5,145,308 | 9/1992 | Vaughn et al. | 414/462 |
| 5,211,526 | 5/1993 | Robinette | 414/462 X |

FOREIGN PATENT DOCUMENTS

| | | | |
|---|---|---|---|
| 438044 | 11/1967 | Switzerland | 280/402 |
| 789296 | 12/1980 | U.S.S.R. | 414/563 |

Primary Examiner—Frank E. Werner
Attorney, Agent, or Firm—Ogram & Teplitz

[57] ABSTRACT

This tow bar is designed for lifting the front wheel and towing a two-wheeled automotive vehicle on its rear wheel and is removable for storage. Primarily, it consists of a top section that has a tongue for fastening to the trailer hitch on the towing vehicle and a lifting device for lifting the bottom section which contains a cradle for the front wheel on the vehicle that is to be towed and the bottom section is secured to the top section by means of uprights that traverse inside the vertical members or masts on the top section.

13 Claims, 1 Drawing Sheet

LIFT AND TOW MOTORCYCLE TRANSPORTER

BACKGROUND OF THE INVENTION

1. Field of the Invention

This invention relates to automotive transport devices, and more particularly to a tow bar which fastens to the trailer hitch on the towing vehicle, a cradle for holding the front wheel of the vehicle which is to be towed and a lifting device for lifting the cradle containing the front wheel and then, with appropriate tie downs and guy straps, tow the automotive vehicle on its rear wheel.

Many motorcycle owners encounter trouble getting them in for service and repairs. This invention not only solves that problem but allows a person to leave either their motorcycle or car for service and repairs while taking the other vehicle to work, etc.

2. Description of the Prior Art

Automobile attached tow bars and lifts are known in the art and are various types. The tow bar, in accordance with the present invention, will enable one person to easily lift the front wheel and tow a two-wheeled automotive vehicle on its rear wheel when desired, and it includes a cradle for holding the front wheel of a two wheeled vehicle and a lifting device for the cradle which holds the front wheel of the two-wheeled vehicle which is to be towed.

The principal object of this invention is to provide a structurally strong yet simple towing device that is light weight for removal and storage and yet is strong enough to lift the front end of a heavy motorcycle and tow it on its rear wheel.

Another object is to provide a cradle for holding the front tire and wheel on the motorcycle which is to be towed.

Still another object is to provide a lift and tow method for towing a motorcycle that is of such design as to lend itself to low cost production manufacturing.

While the present invention will be described in reference to a motorcycle it will be apparent that this invention can be used with any suitable vehicle that does not exceed the load capacity and one that has sufficient ground clearance when the front end is raised for towing.

SUMMARY OF THE INVENTION

A tow bar for a two-wheeled automotive vehicle comprising a cradle that is sized to hold the front wheel on the two-wheeled automotive vehicle which is to be towed, and includes a lifting device that will easily lift the bottom section which contains the cradle. Thus making it easy to to lift the front end of the vehicle which is to be towed on its rear wheel and the tow bar is easily attached and removed from the trailer hitch on the towing vehicle by means of a tongue on the tow bar.

DETAILED DESCRIPTION

Figure 1:
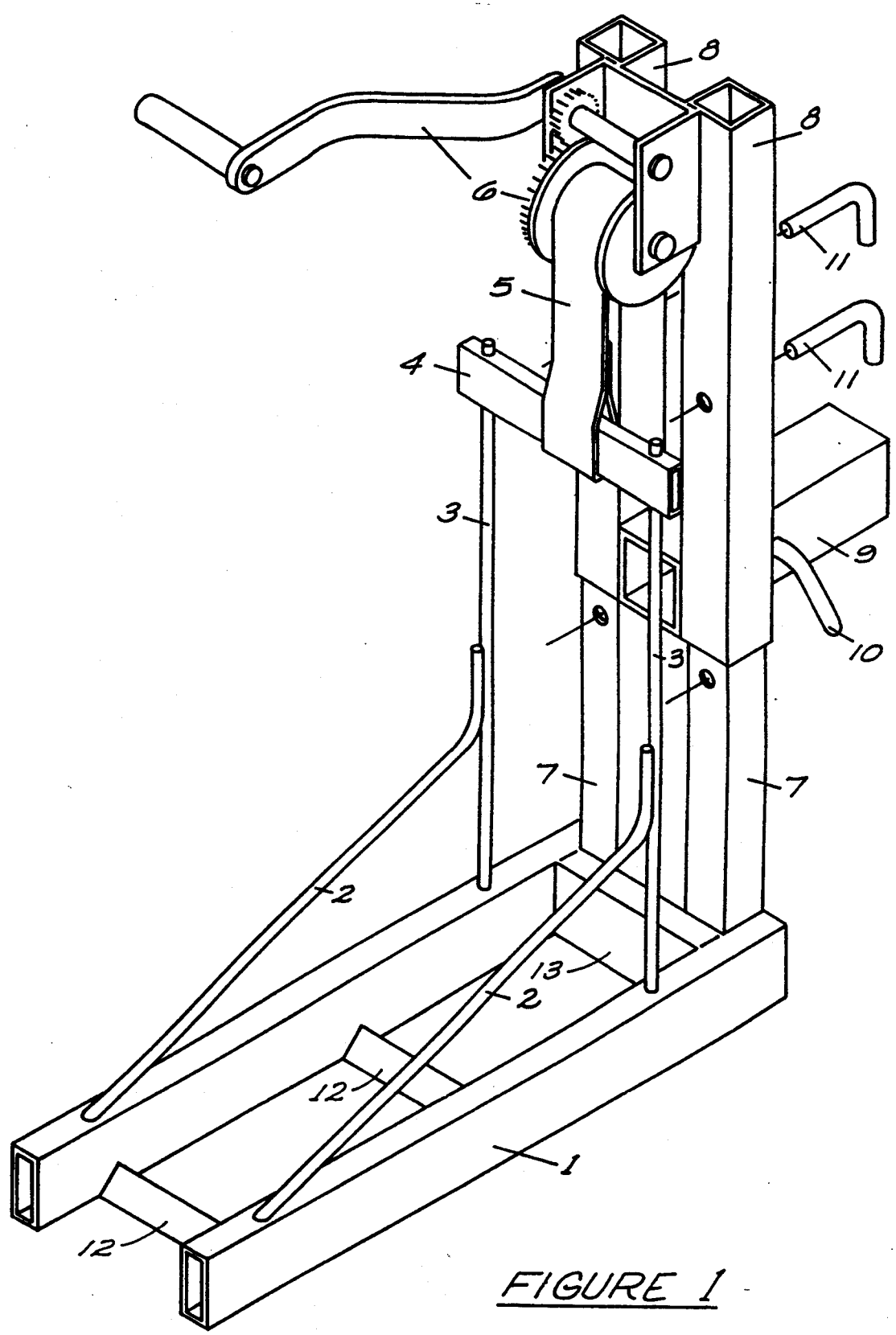
FIG. 1 is a perspective view of the present invention.

Accordingly, the tow bar in FIG. 1, is showing the top section with its two vertical members or masts (8), the lifting device (6), and the tongue (9) securely welded together to form a single ridge section. The bottom section consists of the rails (1) the spacers (12 and 13) and the two vertical members or uprights (7) securely fastened together to form a single section. The pull rods (3) along with the diagonal support rods (2) are welded to the bottom section rails (1) to provide a means of support and attaching to the winch strap on the top section by using the cross bar (4). The locking pins (11) are to be inserted through the holes in uprights (8 and 7) when the lower section is fully raised for towing in order to lock the two sections together and provide stress relief to the winch strap (5) and prevent breakage of the winch strap (5), thus providing safety while towing a two wheeled automotive vehicle. The locking pin (10) is shown for illustration purposes only since this is provided as a part of a class III trailer hitch and is a means of locking the tongue (9) into a class III trailer hitch on the towing vehicle. The tongue (9) can be sized so as to fit a class I, class II, or a class III trailer hitch and is provided with a hole spaced so that a locking pin may be used for fastening the tongue (9) to a trailer hitch on the towing vehicle. The two uprights (7) on the bottom section are sized so as to traverse inside the two uprights (8) on the top section when the lifting device raises the bottom section or when the lifting device allows the bottom section to be lowered thus making the tow bar work as a single adjustable unit. The area formed by the rails (1) and the spacers (12) make up the cradle area which holds the front tire on the two wheeled automotive vehicle which is to be towed.

What I now claim is:

1. A motorcycle towing device comprising:
   a) a top section having,
      1) a tongue secured to a trailer hitch of a towing vehicle,
      2) at least one mast having a bottom end and a top end, said bottom end securely attached to said tongue, said at least one mast extending vertically up from said tongue,
      3) a hand winch attached to said top end of said at least one mast, and,
      4) a winch strap having a first end and a second end, said first end attached to said hand winch such that said hand winch extends and retracts said winch strap; and,
   b) a bottom section having,
      1) at least one upright having a bottom end and a top end, said at least one upright traversing inside said at least one mast of said top section, and,
      2) cradle means attached to said bottom end of said at least one upright for supporting a front wheel of the motorcycle, said second end of said winch strap attached to said cradle means for lifting and lowering said bottom section, said cradle means having,
         A) two horizontal rails attached to said at least one upright,
         B) at least one spacer attached between said two horizontal rails and forming a cradle for a front wheel of said motorcycle,
         C) two vertical pull rods having a top end, a middle portion and a bottom end, said bottom end attached to one of said two horizontal rails, and
         D) a cross bar attached to said top ends of said two vertical pull rods and attached to said second end of said winch strap.

2. The motorcycle towing device according to claim 1 further comprising,
   a) at least one locking pin, b) at least two locking apertures formed in said at least one upright and said least one mast such that when said bottom section is in a raised position, said locking apertures a line permitting said at least one locking pin to pass through said locking apertures of said at least one mast and said at least one upright.

3. The motorcycle towing device according to claim 2 further including at least one diagonal support rod, said at least one diagonal support rod having a first end and a second end, said first end attached to said middle portion of one of said vertical pull rods and said second end attached to one of said two horizontal rails.

4. The motorcycle towing device according to claim 3 further including trailer hitch locking means for securing said tongue to a class III trailer hitch.

5. The motorcycle towing device according to claim 4 wherein said trailer hitch locking means includes,
 a) a hitch locking aperture formed in said tongue, and,
 b) a hitch locking pin moveable through said locking aperture.

6. A towing apparatus for two wheeled vehicles comprising:
 a) a bottom section means for supporting one wheel of a two wheeled vehicle, said bottom section means having,
  1) a cradle portion having,
   A) two horizontal rails attached to said at least one upright,
   B) at least one spacer attached between said two horizontal rails and forming a cradle for a front wheel of the two wheeled vehicle,
   C) two vertical pull rods having a top end, a middle portion and a bottom end, said bottom end attached to one of said two horizontal rails, and,
   D) a cross bar attached to said top ends of said two vertical pull rods, and,
  2) at least one upright;
 b) lifting means engaged with said cradle portion at said cross bar for raising and lowering said bottom section means; and,
 c) top section means for attaching to a towing vehicle and for supporting said lifting means, said top section means having at least one mast wherein said at least one upright of said bottom section means traverses inside said at least one mast of said top section means.

7. The towing apparatus according to claim 6 wherein said lifting means includes at least one diagonal support rod means connected between said middle portion of one of said pull rods and said cradle portion of said bottom section for providing support to said cradle portion.

8. The towing apparatus according to claim 7 further including at least one locking pin means for securing said at least one upright of said bottom section means to said top section means when said bottom section means is in a raised position.

9. The towing apparatus according to claim 8 wherein said top section means includes a tongue for attaching said top section means to a trailer hitch of said towing vehicle.

10. The towing apparatus according to claim 9 further comprising a tongue locking pin means for securing said tongue to said trailer hitch.

11. The towing apparatus according to claim 10 wherein said lifting means includes a hand winch attached proximate to a top of said at least one mast, said hand winch having a winch strap connecting said hand winch to said cross bar.

12. A towing apparatus for towing a two wheeled vehicle comprising:
 a) a towing vehicle;
 b) said two wheeled vehicle; and,
 c) a towing device attached to the rear of said towing vehicle, said towing device having,
  1) a bottom section means for supporting a front wheel of said two wheeled vehicle, said bottom section having,
   a) a cradle portion having
    A) two horizontal rails attached to said at least one upright,
    B) at least one spacer attached between said two horizontal rails and forming a cradle for a front wheel of said two wheeled vehicle,
    C) two vertical pull rods having a top end, a middle portion and a bottom end, said bottom end attached to one of said two horizontal rails, and
    D) a cross bar attached to said top ends of said two vertical pull rods, and,
   b) at least one vertical upright attached to an end of said cradle portion,
  2) a lifting means for raising and lowering said bottom section, said lifting means engaging said cradle portion at said cross bar and,
  3) a top section means for supporting said lifting means and for securing said towing device to said towing vehicle, said top section means having,
   a) a tongue secured to said towing vehicle, and
   b) at least one vertical mast having a top and a bottom, said bottom attached to said tongue and said top secured to said lifting means.

13. The towing apparatus according to claim 12 wherein said lifting means is comprised of,
 a) a hand winch attached to said at least one vertical mast and having a winch strap,
 b) said cross bar attached to said winch strap.

* * * * *